Patented Mar. 2, 1943

2,312,733

UNITED STATES PATENT OFFICE 2,312,733

PROCESS AND AGENT FOR BREAKING PETROLEUM EMULSIONS

Richard A. Salathiel, Houston, Tex., assignor to Standard Oil Development Company, a corporation of Delaware No Drawing. Original application October 19, 1938, Serial No. 235,780. Divided and this application December 19, 1939, Serial No. 309,954

11 Claims. (Cl. 252—333)

This invention relates to a process for resolving water-in-oil emulsions and particularly to a new composition for the resolution of such emulsions. This application is a division of co-pending application Serial Number 235,780, filed October 19, 1938.

Petroleum emulsions of the water-in-oil type comprise fine droplets of naturally occurring waters or brines, dispersed in a more or less permanent state throughout the oil which constitutes the continuous phase of the emulsion. They are obtained from producing wells and from the bottom of oil storage tanks, and are commonly referred to as "cut oil," "emulsified oil," and "bottom settlings."

The object of the present invention is to provide a novel and inexpensive process for separating emulsions of the character referred to into their component parts of oil and water or brine.

Briefly described, the process of the present invention consists in subjecting a petroleum emulsion of the water-in-oil type to the action of a treating agent or demulsifying agent of the kind hereinafter described, thereby causing the emulsion to break down and separate into its components of oil and water or brine, when the emulsion is permitted to remain in a quiescent state after treatment, or is subjected to other equivalent separatory procedures.

The treating agents used in carrying out the present process are essentially condensation products obtained by condensation of an organic unsaturated carbonyl compound with a fatty oil or a fatty acid capable of undergoing the well known Diels-Alder diene condensation with maleic anhydride. Typical of the unsaturated organic carbonyl compounds employed for the production of these agents are polycarboxylic unsaturated open chain acids which are exemplified by maleic acid and fumaric acid which may be employed as such or in the form of their anhydrides, salts or esters, or the corresponding aldehydes and ketones. Benzoquinone may also be mentioned as an example of an unsaturated organic carbonyl compound.

For the sake of simplicity in the following discussion reference will be made to maleic acid and maleic anhydride, it being understood that such references contemplate any of the substances contained in the broad group to which these specific substances belong.

For the purpose of preparing the agents of the present invention, maleic acid is equivalent to maleic anhydride. It is simply more convenient in most cases to use maleic anhydride because of its greater stability and its easier solubility in the organic materials with which it is reacted in preparing these compositions. Also, in esterification reactions less water has to be eliminated to complete the reaction if maleic anhydride, rather than maleic acid, is used.

Fatty acids and fatty glycerides that contain conjugated carbon-carbon unsaturated linkages or unsaturated systems that rearrange with some ease to exhibit such conjugated unsaturated systems have the property of undergoing the Diels-Alder diene reaction with maleic acid, fumaric acid, and the anhydrides, or the esters of these acids. For simplicity in exposition, this property may herein be called diene-reactivity and the oils that exhibit this reaction may be called diene-reactive. Among the fatty oils that show this diene-reactivity to a high degree are tung oil, oiticica oil and dehydrated castor oil. Many other fatty acids show it to a lesser degree, that is, will combine with smaller quantities of, for example, maleic anhydride. Typical examples of diene-reactive fatty acids are eleostearic acids, and licanic acids, 9,11-octadecadienoic acid and other natural and synthetic fatty acids characterized by the presence of a conjugated system of double bonds.

There are two or more steps in the preparation of these derivatives, both or all of which may, as choice and/or conditions determine, be combined into one operation.

The first step in the preparation of these derivatives is condensation of a diene-reactive fatty oil or a diene-reactive fatty acid with maleic anhydride to form polybasic acid bodies. This reaction is carried out in the same general manner as the conventional Diels-Alder reaction. Reaction begins at about 60° C. For a practical rate of reaction the temperature should be at least about 100° C. The temperature is preferably maintained between about 110° C. and 150° C. although higher temperatures may be employed up to the decomposition temperature of the reactants or to the point where experiment demonstrates that other and detrimental reactions take place.

The second step is the reaction of these polybasic acid bodies to form suitable derivatives. These polybasic acid bodies may be combined with water soluble bases, such as NaOH, NH$_4$OH, triethanol amine, etc., to form salts which have demulsifying powers for some emulsions. These polybasic acid bodies also may be esterified with monohydric alcohols and with monohydric ether-alcohols to yield materials that are efficient demulsifying agents. The term ether-alcohol is herein used to designate an organic compound that is characterized by the presence of both alcoholic hydroxyl, (—OH), and etheric oxygen, (—O—), groups. Illustrative examples of these ether alcohols are mono-methyl, mono-ethyl, mono-propyl, mono-butyl, mono-amyl, etc., ethers of methylene glycol, diethylene glycol, triethylene glycol, tetraethylene glycol, etc., propylene glycol, butylene glycol, and other glycols, di-methyl, di-ethyl, di-propyl, di-butyl, etc., ethers of glycerol, and other tri-hydric alcohols, mono-alkyl ethers of tri-methylene glycol, tetra-methylene glycol, penta-methylene glycol, etc. These polybasic acid bodies may also be combined and reacted with polyhydric alcohols to yield excellent demulsifying materials. Typical polyhydric alcohols for use in the preparation of these compounds are ethylene glycol, diethylene glycol, triethylene glycol, tetraethylene glycol, etc., propylene glycol, butylene glycol, etc., trimethylene glycol, tetramethylene glycol, pentamethylene glycol, etc., glycerol, butanetriol, -pentanetriol, -tetramethyl glycerol, pentaglycerol, erythritol, pentaerythritol, ortho, meta, and para phthalyl alcohols, mesicerin, etc.

As an alternative second step or a third step, the polybasic acid bodies or their derivatives may be polymerized and/or condensed to such a degree or to such molecular weight as serves best to treat the emulsion that it is desired to break. An increase in the molecular weight due to combination of unsaturated groupings in similar molecules is best described by the term polymerization. An increase of the molecular weight due to combination of acid and alcohol groupings with the elimination of water to form ester linkages is best termed condensation. Either or both processes may serve to increase the molecular weight in these derivatives.

For most emulsions, these treating agents are improved many times over by condensing and/or polymerizing to the most suitable degree. This most suitable degree must be determined by experiment in each individual case depending on the particular starting material, the emulsion to be treated and the solvent, if any, which is to be employed. Care must be taken, however, to avoid over polymerization, and this stage will be indicated when the polymer suffers a loss in demulsifying power.

In general, the polymerization is carried out, in the case of polybasic acid bodies, in much the same way as polymerization of drying oils is effected in varnish making, and in the case of esters of said bodies in much the same way as the production of alkyd resins. Ordinarily this is by heating at a temperature in the range of about 100° C. to 350° C. for a period varying inversely with the temperature and degree of agitation.

The equipment used and the manner of applying the heat affect appreciably the time and temperature required to reach a given degree of condensation or polymerization. For a given piece of equipment, the exact time and temperature required to yield from a given reaction mixture a product having optimum demulsifying characteristics has to be determined by test.

As an additional step, the derivatives thus formed may be halogenated or hydrogenated to render them more stable against the action of the atmosphere.

The order in which the steps are carried out may in most cases be altered without changing the properties of the final product. Thus, a derivative of the condensed acid body may be prepared before or after condensation together of the unsaturated groupings. For example, it is substantially immaterial whether the mono-ethyl ether of diethylene glycol is esterified with maleic acid and the resulting ester condensed with tung oil or the tung oil is first condensed with maleic anhydride and the resulting condensation product esterified with the mono-ethyl ether of diethylene glycol. It is for convenience in preparation that a given order of reactions is followed, but it is the final product that is described by the reactions set down. Reactions carried out in any other order to obtain these products are to be regarded as equivalent.

It is perfectly apparent that two or more of these methods of preparing derivatives may be combined in the preparation of one derivative. A mixed monohydric alcohol and polyhydric alcohol ester derivative may be formed. Also water soluble or water dispersible products may be formed by partial saponification of the monohydric, polyhydric, or mixed monohydric-polyhydric alcohol ester derivatives. For example such a composition may be made, as follows: the mono-ethyl ether of diethylene glycol is esterified with an excess of maleic anhydride and this acidic ester heated with tung oil to effect the diene condensation; diethylene glycol is added and heated with stirring to bring about esterification, condensation, and polymerization to the desired degree. This product may be altered to render it water dispersible by partial saponification with strong ammonia.

One need not use a single diene-reactive fatty oil or fatty acid in preparing these derivatives, but mixtures of two or more may be used, for example, tung oil and dehydrated castor oil and/or oiticica oil may be used.

Also a mixture of a diene-reactive fatty oil and a nondiene-reactive but heat-reactive fatty oil may be used and when subjected to thermal polymerization the mixture is chemically combined together. For example, dicarbitol maleate may be condensed with tung oil and then to this may be added a slightly diene-reactive but heat-reactive fatty oil, such as linseed oil or corn oil and the mixture condensed together and polymerized to the desired degree by heating.

Variations in the proportions of the ingredients causes variation in the product so that various products particularly well adapted to treat various emulsions may be obtained. But for very good demulsification of a wide variety of emulsions, the combinations and proportions shown in the examples given are excellent.

The demulsifying agents of the present invention have the desirable property of being in most cases capable of dilution with petroleum sulfonates, a cheap by-product of the petroleum industry, without suffering any substantial loss in potency. Indeed, in many cases, the mixture of a demulsifying agent according to the present invention with petroleum sulfonates is more effective than either alone. It has been observed that those agents, made according to the present invention, which are polymers have a tendency to be improved by the addition of petroleum sulfonates which tendency increases with the degree of polymerization. It may be remarked that the petroleum sulfonates employed are most miscible with the demulsifying agents of the present invention the less water they contain. The amount of petroleum sulfonate employed will depend on the emulsion to be treated. With oil soluble sulfonates, the dilution may be carried to any desired degree.

Specific illustrations of products of the type hereinbefore generally described which are suitable for use in accordance with the present invention are set forth below. It is to be understood that the present invention is not in any way restricted to the specific chemicals described in these examples or the proportions in which they are employed, as it will be readily apparent that equivalents of these specific chemicals and other proportions, as well as variations of the order and mode of combination, may be employed without departing from the spirit of the present invention or the scope of the appended claims. These proportions in these examples are in parts by weight.

Example I

Tung oil, 700 parts, and maleic anhydride, 78 parts, are heated together at 120° C. for a few minutes to effect condensation. Diethylene glycol, 85 parts, is added and the mixture is thoroughly agitated and heated at 175° to 180° C. for 100 minutes. The product, a very viscous oil, is soluble in most common organic solvents and solvent mixtures.

Example II

Tung oil, 700 parts, and maleic anhydride, 78 parts are heated together at 120° C. for a few minutes to effect condensation, glycerol, 183 parts, is added, the mixture being stirred with an efficient mechanical stirring device, and heated at 215° C. for 45 minutes. The viscous oil thus obtained is soluble in aromatic solvents, alcohols, and most oil solvents.

Example III

Oiticica oil, 700 parts, and maleic anhydride, 78 parts, are heated together for a few minutes at 120° C. to effect condensation. Glycerol, 183 parts, is added and the mixture is thoroughly stirred and heated at 193° C. for 55 minutes. The resulting product is a viscous oil soluble in most organic solvents and organic solvent mixtures.

Example IV

A commercial dehydrated castor oil, 880 parts, and maleic anhydride, 98 parts, are heated together at 150° C. for a few minutes to effect condensation. Diethylene glycol, 108 parts, is added, the mixture stirred and heated at 175° C. for 90 minutes. The product is a highly viscous oil soluble in most fatty oil solvents.

Example V

Dicarbitol maleate, 630 parts, and tung oil, 645 parts, are heated together at 150° C. for 30 minutes to effect condensation. The product may be used in this form to advantage on some emulsions. Used on other emulsions it is more effective if first polymerized to some degree by subjecting it to the influence of heat. A product, highly effective on a great variety of emulsions, is produced by heating at 230° C. for 90 minutes. The product is an oil of about the consistency of a medium grade motor oil. It is soluble in alcohols, aromatic solvents, in many oil solvents, and solvent mixtures, but is not soluble in straight petroleum solvents.

Example VI

A similar composition, highly efficient on a great variety of petroleum emulsions, particularly when applied in some admixtures containing petroleum sulfonates, is produced by heating dicarbitol maleate, 550 parts, and tung oil, 700 parts, together at 150° C. for 30 minutes to effect the diene condensation. This product is then polymerized by heating at 230° C. for 110 minutes. The product is a viscous oil.

In practicing the process of the present invention, a treating agent or demulsifying agent of the kind above described may be brought into contact with the emulsion to be treated in any of the numerous ways now employed in the treatment of petroleum emulsions of the water-in-oil type with chemical demulsifying agents, such as, for example, by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of the various kinds of apparatus now used in the operation of breaking petroleum emulsions, such as homogenizers, hay tanks, gun barrels, filters, centrifuges, or electrical dehydrators.

The materials previously described need not be employed alone, as demulsifying agents, but may be employed in conjunction with other suitable demulsifiers, such as water softeners, modified fatty acids, oil-soluble or water-soluble petroleum sulfonic acids, substituted aromatic sulfonic acids, substituted amine sulfonic bodies, etc., or the like. One may add any suitable inert solvent or solvents to the reagent contemplated, particularly solvents which lower the viscosity of the product and make it more adaptable for use, such as kerosene, solvent naphtha, cresol, pine oil, ethyl alcohol, methyl alcohol, iso-propyl alcohol, butyl alcohol, etc.

The amount of treating agent on the anhydrous basis that is required to break the emulsion may vary from approximately one part of treating agent to five hundred parts of emulsion up to a ratio of one part of the treating agent to thirty thousand parts of emulsion depending upon the particular emulsion being treated. In treating exceptionally "tight" emulsions or tank bottoms the maximum ratio may be necessary while in treating fresh emulsions that yield readily to chemical treatment the minimum ratio will frequently produce satisfactory results. For the average emulsion the ratio of one part of treating agent to ten thousand parts of emulsion will usually be found to produce commercially satisfactory results.

It is, of course, understood that some experiment will be required in order to select the precise agent of the aforedescribed group which should be employed for any given emulsion and the quantity in which it is to be employed. As is well known, emulsions vary from well to well and from time to time in any given well, so that it is quite impossible to lay down any general rule which will be applicable to all emulsions which may be encountered. In order to give some indication, however, of the utility of the agents produced according to the present invention, in the treatment of emulsions, the following specific cases are given. The tests hereinafter described were carried out in laboratory glassware under conditions similar to those which generally exist in the field in treating petroleum emulsions.

A crude petroleum emulsion (from the Humble Gail #53 well on the John Gaillard lease in the Goose Creek, Texas, field) which contained 40% of salt water was broken practically completely down to layers of clear salt water and clear oil within five minutes after adding one part of the material prepared as described in Example V to 2500 parts of the emulsion and mixing thoroughly at 125° F. and permitting to stand quietly. The untreated emulsion remains practically unchanged for many hours under the same conditions.

The same emulsion is caused to separate into its component parts of oil and brine within fifteen minutes by warming slightly and adding one part of the material prepared as described in Example V together with one part of oil-soluble sodium salts of petroleum sulfonic acids to 4000 parts of the emulsion, mixing thoroughly and allowing to stand.

Even several times the amount of the oil soluble sodium salts of petroleum sulfonic acids which in the above case was added, if applied alone under the same conditions, has no appreciable effect in breaking this emulsion.

The same emulsion is caused to separate into its component parts of brine and water in fifteen minutes at 125° F. by adding 3 parts of the material prepared as described in Example VI mixed with 7 parts of oil soluble sodium salts of petroleum sulfonic acids, to 20,000 parts of the emulsion and mixing thoroughly and allowing to stand.

A crude petroleum emulsion (from the Humble Gail #53 well on the John Gaillard lease in the Goose Creek, Texas, field) which contained 68% of salt water was caused to separate practically completely into layers of clear oil and clear salt water within 15 minutes at 125° F. by adding a solution in a little toluene of 1 part of the material prepared as described in Example I to 3,300 parts of the emulsion, mixing thoroughly with the emulsion and then allowing the mixture to stand.

The untreated emulsion under the same conditions remains practically unchanged for several hours.

The same emulsion was caused to separate practically completely within 15 minutes at 125° F. by adding a solution in a little toluene of 1 part of the material prepared as described in Example I and 1 part of oil soluble sodium salts of petroleum sulfonic acids, to 6,600 parts of the emulsion, mixing well and allowing to stand.

Even several times the amount of the oil soluble sodium salts of petroleum sulfonic acids which, in the above case, was added, if applied alone under the same conditions, has no appreciable effect in breaking this emulsion.

The present invention having been thus described, what is claimed as new and useful and is desired to be secured by Letters Patent is:

1. A process for breaking petroleum emulsions of the water-in-oil type which comprises subjecting the emulsion to the action of a mixture including a product obtained by condensing according to the Diels-Alder reaction a material of the class consisting of diene-reactive fatty oils and diene-reactive fatty acids with an organic unsaturated carbonyl compound operative in a Diels-Alder synthesis and an oil soluble sulphonated product derived from petroleum oil.

2. A process for breaking petroleum emulsions of the water-in-oil type which comprises subjecting the emulsion to the action of a mixture of an ester derivative of the body obtained by a Diels-Alder condensation with an organic unsaturated carbonyl compound operative in a Diels-Alder synthesis of a material of the class consisting of diene-reactive fatty oils and diene-reactive fatty acids and an oil soluble sulphonated product derived from petroleum oil.

3. A method according to claim 1 in which the sulphonated product is the sodium salt of an oil soluble petroleum sulphonic acid.

4. A method according to claim 2 in which the sulphonated product is a sodium salt of an oil soluble petroleum sulphonic acid.

5. A demulsifying agent for petroleum emulsions of the water-in-oil type which comprises a mixture containing a Diels-Alder condensation product of a material of the class consisting of diene-reactive fatty oils and diene-reactive fatty acids with an organic unsaturated carbonyl compound operative in a Diels-Alder synthesis, and an oil soluble sulphonic product derived from petroleum oil.

6. A demulsifying agent for petroleum emulsions of the water in oil type comprising a mixture containing a Diels-Alder condensation product of a polybasic unsaturated open chain acid body operative in a Diels-Alder synthesis with a material of the class consisting of diene-reactive fatty acids and neutral esters thereof and an oil soluble sulphonated product derived from petroleum oil.

7. A demulsifying agent for petroleum emulsions of the water-in-oil type comprising a mixture containing a polymer of a Diels-Alder condensation product of a polybasic unsaturated open chain acid body operative in a Diels-Alder synthesis with a material of the class consisting of diene-reactive fatty acids and neutral esters thereof and an oil soluble sulphonated product derived from petroleum oil.

8. A demulsifying agent for petroleum emulsions of the water-in-oil type comprising a mixture containing an ester of a Diels-Alder condensation product of a polybasic unsaturated open chain acid body operative in a Diels-Alder synthesis with a material of the class consisting of diene-reactive fatty acids and neutral esters thereof and an oil soluble sulphonated product derivative from petroleum oil.

9. An agent according to claim 6 in which the sulphonated product is the sodium salt of an oil soluble petroleum sulphonic acid.

10. An agent according to claim 7 in which the sulphonated product is the sodium salt of an oil soluble petroleum sulphonic acid.

11. An agent according to claim 8 in which the sulphonated product is the sodium salt of an oil soluble petroleum sulphonic acid.

RICHARD A. SALATHIEL.